United States Patent [19]

Emori et al.

[11] 4,083,310
[45] Apr. 11, 1978

[54] VEHICLE GUIDANCE SYSTEM INCORPORATING TRACK

[76] Inventors: Richard Ichiro Emori, 1-50-10 Wada, Suginami, Tokyo, Japan, 166; Koji Suzuki, 2-26-3-1236 Takashimadaira, Itabashi, Tokyo, Japan, 175

[21] Appl. No.: 658,465

[22] Filed: Feb. 17, 1976

[30] Foreign Application Priority Data

Feb. 21, 1975 Japan .................................. 50-021015

[51] Int. Cl.² .............................................. B61F 9/00
[52] U.S. Cl. .................................. 104/242; 104/244; 180/131
[58] Field of Search .................... 104/242, 244, 244.1, 104/245, 247; 180/79, 79.1, 131; 280/87 R, 87 B, 111, 112 R, 112 A, 771, 772, 104

[56] References Cited

U.S. PATENT DOCUMENTS

| | | | |
|---|---|---|---|
| 861,830 | 7/1907 | Hackney | 104/244 |
| 2,083,381 | 6/1937 | Hutchison, Jr. | 280/104 |
| 2,181,377 | 11/1939 | Mabie | 104/247 UX |
| 2,424,288 | 7/1947 | Severy | 180/131 |
| 2,850,290 | 9/1958 | Burgmann | 280/112 A |
| 2,992,692 | 7/1961 | Chausson | 104/245 X |
| 3,147,990 | 9/1964 | Wettstein | 280/104 |
| 3,724,584 | 4/1973 | Varichon | 104/244.1 X |
| 3,814,025 | 6/1974 | Nelson | 104/242 |

FOREIGN PATENT DOCUMENTS

| | | | |
|---|---|---|---|
| 580,174 | 7/1959 | Canada | 280/111 |
| 735,769 | 11/1932 | France | 104/247 |

*Primary Examiner*—Drayton E. Hoffman
*Assistant Examiner*—Randolph A. Reese
*Attorney, Agent, or Firm*—Mahoney, Schick & Cislo

[57] ABSTRACT

This invention relates to a vehicle guidance system where the vehicles incorporate wheels having tires thereupon to follow a track of predetermined cross-section. The vehicle is provided with sensors to continuously sense the lateral location of the vehicle relative to the cross-section of the track and the yaw angle of the vehicle with respect to the longitudinal axis of the track. A modulator receives the output of the sensor to drive the steering system of the vehicle in order to correct for deviations of the vehicle from its predetermined relationship with the track contour.

3 Claims, 7 Drawing Figures

IN CASE OF $\ell_1 < \ell_2$   IN CASE OF $\ell_1 > \ell_2$

VEHICLE GUIDANCE SYSTEM INCORPORATING TRACK

BACKGROUND OF THE INVENTION

Numerous expedients have been suggested in the prior art for guidance of vehicles incorporating wheels which are provided with tires, such as the conventional automobile. Among these have been centrally located monorail tracks adapted to be engaged by guidance mechanisms on the vehicle; tow-bar mechanisms and electronic input devices adapted to generate signals to govern the operation of an electronic steering mechanism incorporated in the vehicle.

It has been discovered that the use of various types of track means in conjunction with conventional tired automotive vehicles is infeasible due to the fact that there is a tendency of the vehicle wheels to become displaced with respect to the longitudinal axis of the associated track. Consequently, the utilization of track guidance means in conjunction with conventional vehicles has been discarded as an effective solution to the problem of automating the movement of large numbers of individual automotive vehicles.

OBJECTS AND ADVANTAGES OF THE INVENTION

It is, therefore, an object of our invention to provide an automotive type vehicle having rubber tired wheels in conjunction with a track of predetermined cross-section, wherein the vehicle incorporates sensor means adapted to determine the lateral or angular deviation of the vehicle from the longitudinal axis of the associated track.

The output of the sensor means incorporated in the vehicle is applied to modulator means which, in turn, operates the steering of the vehicle to automatically correct for lateral or angular deviation of the vehicle from a predetermined norm.

Another object of our invention is the provision of a guidance system for an automotive vehicle adapted to be utilized in conjunction with a track-like roadway of predetermined cross-section, wherein the wheels of the vehicle and/or separately provided sensors are utilized to signal the lateral or angular deviation of the vehicle from a predetermined relationship with the roadway and wherein the output signal is impressed on the steering system of the vehicle to automatically correct for such deviation.

A further object of our invention is the provision, in a system of the aforementioned character, of mechanical, electrical or hydraulic means and for sensing lateral or angular deviation; for communicating the sensor signal to the steering system of the vehicle for controlling the orientation of the vehicle. Other objects and advantages of the invention will be made apparent by the following specification and accompanying drawings.

A further object of our invention is the provision of sensors on a vehicle to continually sense the distances from four specified points on the vehicle to the track surface. An associated object of our invention is the provision of the sensors at the right and left front and right and left rear areas of the vehicle whereby the vertical distance can be measured approximately perpendicular to the track surface or vertical to the ground as shown in FIG. 5 of the drawing.

DESCRIPTION OF THE BEST EMBODIMENTS CONTEMPLATED

Figure 4:
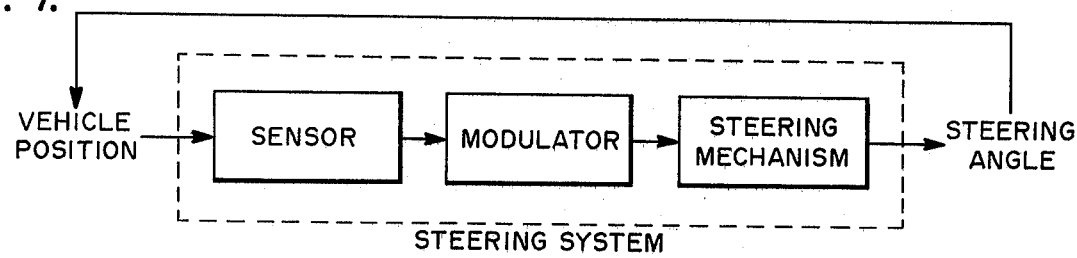
FIG. 4 is a block diagram of the automatic orienting mechanism of the vehicle.

The steering system of the vehicle is basically composed of three functional blocks, as shown in FIG. 4, that is, (a) sensor, (b) modulator and (c) steering mechanicsm.

Figure 5:
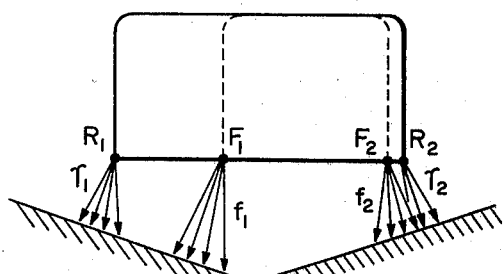
FIG. 5 is a schematic diagram illustrating the manner in which displacement of the vehicle with respect to the track roadway can be determined.

(a) Sensor. The sensor means continuously the lateral location of the vehicle relative to the cross-section of the track and the yaw angle of the vehicle with respect to the longitudinal axis of the track. The sensor also continuously senses the aforementioned distances of the four points of the vehicle with respect to the track surface in as substantially perpendicular a relationship with the track surface as possible. As in the prototype, shown schematically in FIGS. 6 and 7, the wheels may be used as sensors, or separate sensors may be used. Also, distances $f_1$, $f_2$, $r_1$, $r_2$, FIG. 5, may not necessarily be vertical distance of points $F_1$, $F_2$, $R_1$, $R_2$ of the vehicle to the track surface, but the sensors could be made to sense any distances as shown in FIG. 5 as the total system design calls for.

The angle S of steering wheels is specified by a function, in general, $$S = g(f_1, f_2, r_1, r_2)$$

where $f_1$, $f_2$, $r_1$, $r_2$ are the distances of four points $F_1$, $F_2$, $R_1$, $R_2$ on the vehicle to the track surface. As mentioned previously, the four points must be located in the right and left front and in the right and left aft areas of the vehicle and the distances must be measured approximately perpendicular to the track surface or vertical to the ground surface.

The cross section of the track roadway may be "V" or "reverse V" shaped, or a combination thereof. The sides of the "V", on which the wheels of the vehicle roll, may be straight or curved lines.

(b) Modulator. The information relating to the lateral location and the yaw angle of the vehicle as picked up by the sensors is fed into the modulator. The modulator processes the input signal in a proper manner and the output from the modulator is used to drive the steering mechanism. The system may be mechanical as incorporated in the prototype, electrical, hydraulic, or a combination thereof.

(c) Steering mechanism. The mechanism is to receive the output signal from the modulator, and to rotate the steering wheel to the angle S. The mechanism may also be mechanical, electrical, hydraulic, or a combination thereof.

It is now obvious that a variety of steering systems may be formed by different combinations of sensor, modulator and steering mechanism. Here, the system function is illustrated with the one used in the prototype. The prototype uses, as shown in FIGS. 6 and 7:

(a) running wheels as sensors;
(b) a mechanical linkage as modulator;
(c) a tie-rod as the steering mechanism.

Figure 6:
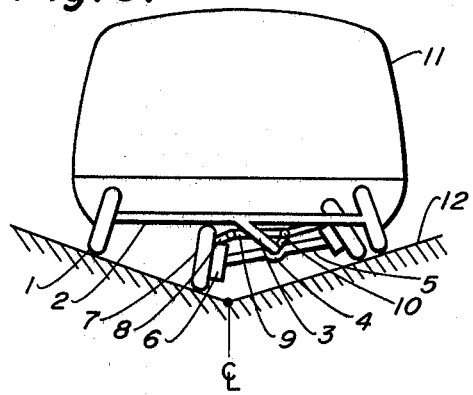
FIG. 6 is a schematic illustration of one embodiment of the control system of the vehicle.
Figure 7:
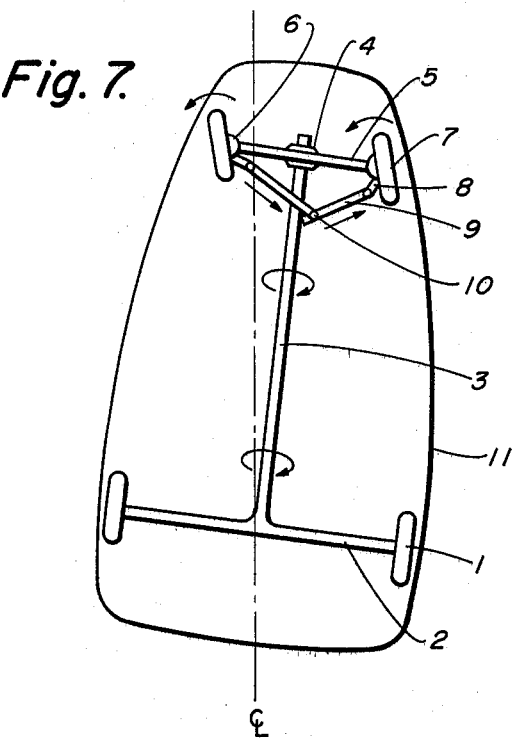
FIG. 7 is a schematic bottom plan view of the aforesaid control system.

Referring to FIGS. 6 and 7 of the drawings, rear wheels 1 are attached to the rear axle 2, and a torsion rod 3 is firmly connected to the rear axle 2 at its midpoint. Toward the front end of the torsion rod 3, a vertical steering column 10 is rigidly attached, so that the top end of the column rotates as the torsion rod 3 rotates. Two tie-rods 9 are connected to the top portion of the column 10 through flexible joints, and the other ends of the rods 9 are connected to steering arms 8 through flexible joints. The arms 8 are rigidly connected to the front wheels 7. The wheels are supported by kingpins 6 and steer the vehicle 11. The front axle 5 holds the kingpins 6 at its ends, and a support bearing 4 on the front axle 5 supports the front end of the torsion rod 3. 12 is the V-shaped track.

If, for example, the vehicle 11 assumes the position of FIG. 6 relative to the track 12, the rear axle 2 rotates clockwise with respect to the front axle 5, looking at the vehicle from behind. This rotation causes the torsion rod 3 to rotate clockwise and moves the tie-rods 9 as shown. Then the front wheels are turned counter-clockwise, looking at the vehicle from the top, in such a way that the position of the vehicle is corrected toward the center of the track.

The prototype demonstrated the remarkable ability of the vehicle to follow the track automatically with a very simple mechanical system to steer on a simple form of a track. This indicates that the invention is a breakthrough in the transportation technology of vehicles on four tire wheels with no extra tires to force the vehicle to follow the track.

Figure 1:
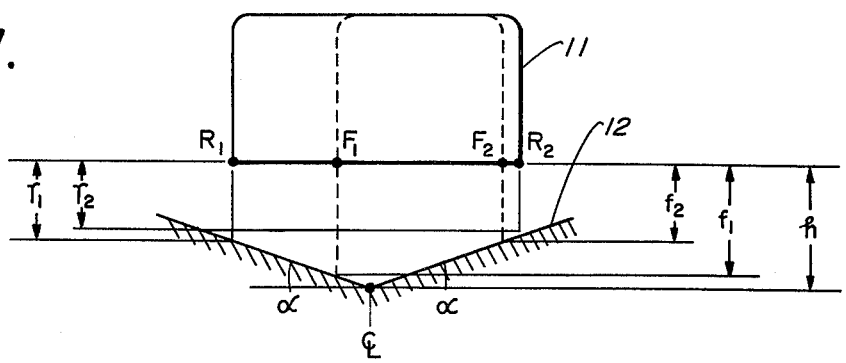
FIG. 1 is a schematic view, illustrating the relationship between the track roadway and the associated vehicle.
Figure 2:
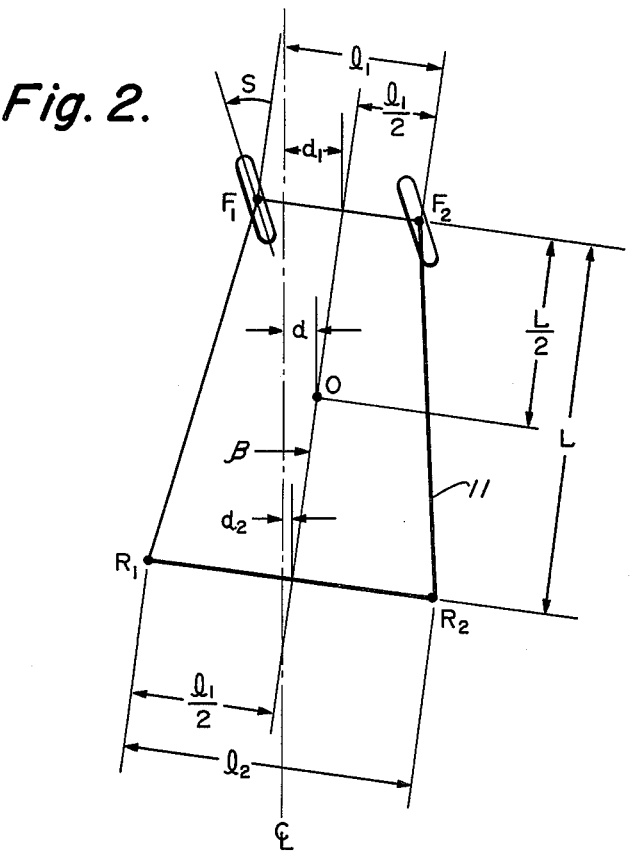
FIG. 2 is a schematic view, illustrating the possible lateral and angular deviation of the vehicle from a predetermined axis of the track roadway.

The angle of steering wheels 7 in FIG. 2 is determined by a function, in general, $$S = g(f_1, f_2, r_1, r_2) \qquad (1)$$

where $f_1$, $f_2$, $r_1$, $r_2$, FIGS. 1 and 5, are the heights (or distances) of points $F_1$, $F_2$, $R_1$, $R_2$ on the vehicle from the track surface.

The cross-section of the track roadway may be "V" or "reverse V" shaped, or a combination thereof. The sides of the "V", on which the wheels of the vehicle roll, may be straight or curved lines.

To explain the principle of vehicle steering, an actually built prototype system is shown schematically in FIGS. 1 and 2. FIG. 1 shows the vehicle 11 on the track 12 which is V-shaped in cross-section with the side surfaces inclined by the angle $\alpha$ from the horizontal as shown. The vehicle has a steering mechanism which specifies the angle of the steering wheel by $$S = C\left(\frac{r_2 - r_1}{l_2} - \frac{f_2 - f_1}{l_1}\right) \qquad (2)$$

where $f_1$, $f_2$, $r_1$, $r_2$ are the heights $F_1$, $F_2$, $R_1$, $R_2$ on the vehicle from the track surface; $l_1$, $l_2$ are front and rear wheel treads; and C is a proportionality constant.

From the geometry of the vehicle and the track as shown in FIGS. 1 and 2, $f_1$, $f_2$, $r_1$, $r_2$ are expressed approximately as $$\begin{aligned} f_1 &= h - \left(\frac{l_1}{2} - d_1\right)\tan\alpha \\ f_2 &= h - \left(\frac{l_1}{2} + d_1\right)\tan\alpha \\ r_1 &= h - \left(\frac{l_2}{2} - d_2\right)\tan\alpha \\ r_2 &= h - \left(\frac{l_2}{2} + d_2\right)\tan\alpha \end{aligned} \qquad (3)$$

where $h$ is the height of the center of the plane $F_1F_2R_1R_2$ from the bottom of the V-shaped track as shown in FIG. 1.

Also the yaw angle $\beta$ of the vehicle and the lateral deviation $d$ of the center of the vehicle are expressed as $$\beta = d_1 - d_2/L, \quad d = d_1 + d_2/2 \qquad (4)$$

where $d_1$, $d_2$ are the lateral deviations of the midpoints of $F_1F_2$ and $R_1R_2$ respectively, and L is the distance between the midpoints of $F_1F_2$ and $R_1R_2$ as shown in FIG. 2 $\beta$ is in the radians. From equations (2), (3), (4), the angle of the steering wheel is obtained as $$S = C\tan\alpha\left[L\beta\left(\frac{1}{l_1} + \frac{1}{l_2}\right) + 2d\left(\frac{1}{l_1} - \frac{1}{l_2}\right)\right] \qquad (5)$$

(The above computation assumed that the vehicle body is horizontally oriented. Even if the body is not horizontally oriented, effects will be cancelled out and the same result is obtained.)

The relation (5) specifies the steering angle S as a function of the yaw angle $\beta$ and the lateral deviation $d$. The respective proportionality constants are $$CL(1/l_1 + 1/l_2)\tan\alpha \text{ and } 2C(1/l_1 - 1/l_2)\tan\alpha$$

These constants are equivalent to sensitivities of the steering angle to $\beta$ and $d$, and may be made to take any value by properly selecting C, L, $\alpha$, $l_1$, and $l_2$ to optimize the track-following characteristics of the vehicle. In the actual prototype, these parameters were selected in such a way that the wheel is steered as in Table 1.

| d | − | 0 | + |
|---|---|---|---|
| − | + | + | + or − |
| 0 | + | 0 | − |
| + | + or − | − | − |

In the table, the lateral deviation $d$ is positive if it is to the right and the rotation is positive if it is clockwise, both looking down into the vehicle.

Figure 3:
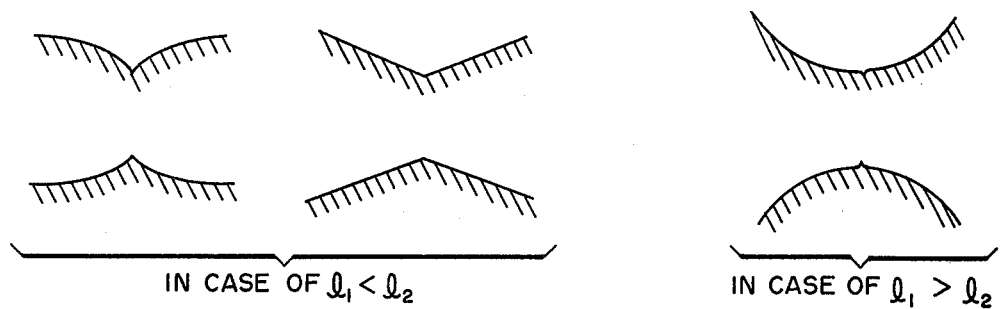
FIG. 3 is an illustration showing various cross-sections of track roadway adapted to be utilized in conjunction with the vehicle of the invention.

As explained by the above example, the basic principle of steering to make the vehicle follow the track automatically is indicated by the equation (1), whose characteristics may be arbitrarily specified by the parameters C, $l_1$, $l_2$, L and the geometry of the track cross-section. Several cross-sections which impart track-following characteristics to the vehicle are shown in FIG. 3.

Although the prototype utilized in testing the principles of the invention is specifically designed to have the wheels act as sensors; a torque shaft and corresponding linkage act as the modulator; and a steering linkage be connected to the modulator to operate the steering wheels, it is, of course, obvious to one skilled in the art that other sensor and modulating means could be utilized in substitution therefor. For instance, a fifth wheel or electrical probe may be used to sense the location of the four points of the vehicle body with respect to the opposed surfaces of the track. If the vehicle is electrically powered another possibility is the use of the electrical collectors as sensors.

We claim:

1. In an automatic guidance system for a vehicle having steering wheels and rear wheels, the combination of: a track for said vehicle having nonplanar wheel engageable surfaces disposed in opposition to each other; sensor means connected to said vehicle for determining the divergence of said vehicle from the longitudinal axis of said track, said sensor means including the rear wheels of said vehicle; modulator means for transmitting the signal generated by said sensor means; and a steering mechanism connected to said steering wheels and to said modulator means whereby the sensor-generated signal is impressed upon said steering mechanism to cause said steering wheels to be automatically actuated to eliminate lateral or axial divergence of said vehicle with respect to said track surfaces.

2. A guidance system of the character defined in claim 1 in which said rear wheels are mounted for rotatable movement about the longitudinal axis of said vehicle to sense the divergence of said vehicle from the longitudinal axes of said track surfaces.

3. A guidance system of the character defined in claim 1 in which said rear wheels are rotatably mounted on said vehicle for rotation about a longitudinal axis and said modulator means includes a torque shaft and linkage connected to said steering mechanism, whereby rotation of said torque shaft is communicated to said steering mechanism through said linkage when said vehicle diverges from the longitudinal axes of said track surfaces.

* * * * *